April 30, 1957 A. K. SCHENCK 2,790,965

VOICE FREQUENCY ALARM AND REMOTE CONTROL SYSTEM

Filed Dec. 17, 1953 4 Sheets-Sheet 1

INVENTOR
A. K. SCHENCK
BY C. Mattice
ATTORNEY

April 30, 1957 A. K. SCHENCK 2,790,965

VOICE FREQUENCY ALARM AND REMOTE CONTROL SYSTEM

Filed Dec. 17, 1953 4 Sheets-Sheet 2

INVENTOR
A. K. SCHENCK
BY C. Mathie
ATTORNEY

INVENTOR
A. K. SCHENCK
BY C. Mattice
ATTORNEY

April 30, 1957 A. K. SCHENCK 2,790,965

VOICE FREQUENCY ALARM AND REMOTE CONTROL SYSTEM

Filed Dec. 17, 1953 4 Sheets-Sheet 4

INVENTOR
A. K. SCHENCK
BY C. Mattice
ATTORNEY

United States Patent Office 2,790,965

Patented Apr. 30, 1957

2,790,965

VOICE FREQUENCY ALARM AND REMOTE CONTROL SYSTEM

Alfred K. Schenck, Glen Ridge, N. J., assignor to Bell Telephone Laboratories, Incorporated, New York, N. Y., a corporation of New York Application December 17, 1953, Serial No. 398,737

6 Claims. (Cl. 340—163)

This invention relates to alarm signaling systems and has for its object to facilitate the indication of alarm and other conditions at remote signaling stations.

More particularly the invention provides an alarm signaling arrangement of the type disclosed in United States Reissue Patent 23,571 granted to Clutts-Pullis-Schenck-Weber November 11, 1952, but one which requires simpler equipment at the individual signaling stations.

In accordance with the present invention all signaling frequencies are generated at the main station, there being one frequency for each of the auxiliary stations. Two channels connect the main station with all of the auxiliary stations, the station frequencies being transmitted over one channel. Each auxiliary station detects its own frequency and returns it to the main station over the second channel.

One feature of the present invention lies in means for interrupting the transmitted frequency at different speeds together with means controlled in accordance with the speed of interruption to operate the proper responsive equipment at the auxiliary stations.

More particularly the transmitted frequency may be interrupted at one rate to transmit an order and at a different rate to control a scanning operation for trouble identification. Normally a prolonged interruption of the returned frequency controls means at the main office to indicate a trouble at the corresponding auxiliary office. During a scanning operation the scanning means at the auxiliary office prevents the return of the station frequency to the main office while the scanning means at the main office disables the trouble indicating means.

These and other features of the invention will be more clearly understood from a consideration of the following description read in connection with the attached drawings in which.

Certain of the details of the present system are the same as the corresponding equipment in the above-identified Clutts et al. patent and have been shown only schematically, reference being made to the Clutts et al. patent for a complete description thereof.

Figure 1:
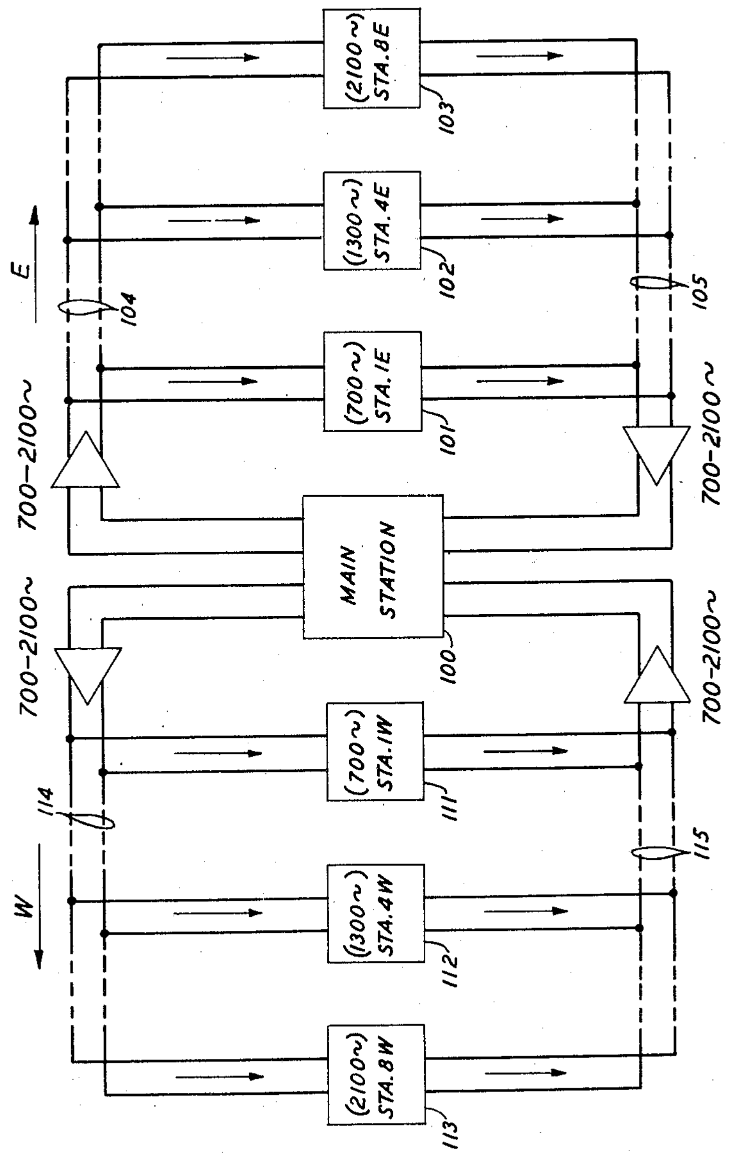
Fig. 1 is a schematic showing of an alarm system embodying the present invention.

The general plan of the system is shown in Fig. 1. The main station 100 furnishes one frequency for each auxiliary station, such as stations 101, 102 and 103, transmitting all of these frequencies continuously under normal conditions over channel 104. It is contemplated that as many as eight auxiliary stations may be served using eight frequencies, such as 700, 900, 1100, 1300, 1500, 1700, 1900 and 2100 cycles. The auxiliary stations 101, 102 and 103 shown are assumed to use 700, 1300 and 2100 cycles. Each auxiliary station separates its assigned frequency by means of a band-pass filter and normally permits this frequency to be returned to the main station over channel 105 where it is separated by a band-pass filter, detected and recognized as a continuous O. K. signal from the corresponding station. By transmitting the same frequencies over a second channel 114 a second set of auxiliary stations 111, 112 and 113 may be served. Stations 111, 112 and 113 return their individual frequencies over channel 115 and a second set of band-pass filters and detectors would be used to recognize the O. K. signals from the second set of auxiliary stations. It will, of course, be understood that the number of frequencies employed, and whether or not two channels would be used, would be determined by the number of auxiliary stations to be served and their location with respect to the main station.

As will be described in more detail hereinafter, an alarm is sent from any auxiliary station by the interruption of its particular and normally retransmitted frequency for a period of several seconds, the main station recognizing this comparatively long interruption of the frequency as an alarm signal and identifying the auxiliary station from its frequency assignment. Orders are sent from the main station to any chosen auxiliary station by interrupting the corresponding frequency by means of dial contacts at, for example, a rate of twenty pulses per second. The auxiliary station recognizes this rate of interruption as an order signal and operates a receiving device to register the order sent. If, in response to an alarm signal, it is desired to determine the nature of the cause of the alarm, a scanning signal is transmitted to the auxiliary station by interrupting the frequency assigned to the station which caused the alarm signal at a slower rate, for example, a rate of five pulses per second. The particular auxiliary station recognizes this slower rate of interruption as a scan signal and proceeds to step its scanning circuit successively over each alarm point. At the main station a receiving scanner is stepped in synchronism with the auxiliary station scanner. During the scanning operation no frequency is returned by the auxiliary station but the corresponding alarm circuit at the main station is disabled so that this interruption of the station frequency will not bring in an alarm. When a grounded alarm point is found at the auxiliary station, the frequency is momentarily returned to the main station where the position of the synchronized receiving scanner causes the operation of means for identifying the trouble.

Figure 2:
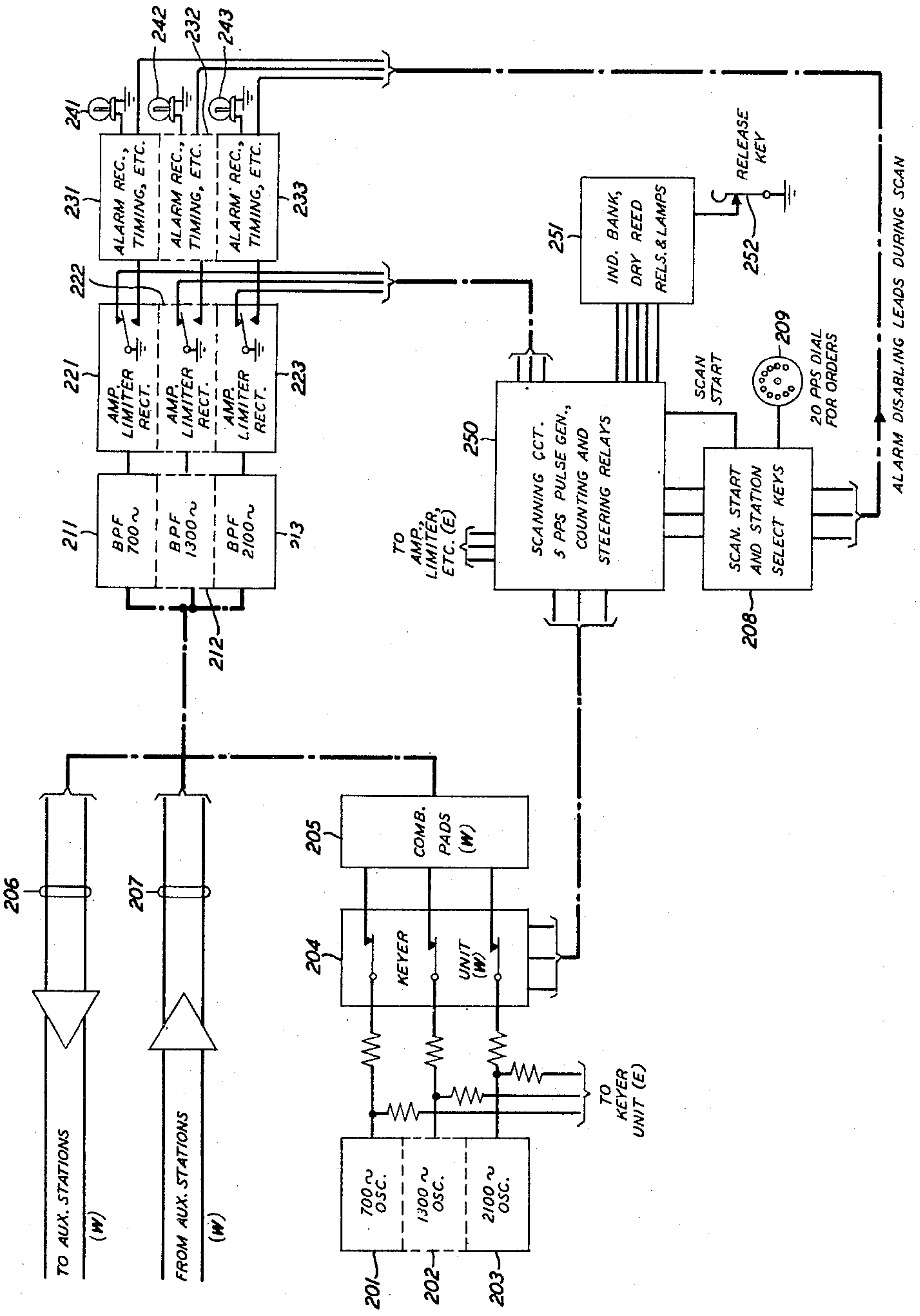
Fig. 2 is a schematic showing of the equipment at the main station.

Fig. 2 is a functional diagram of the equipment at the main station. One oscillator, such as oscillators 201, 202 and 203, is provided for each auxiliary station or for each pair of east and west auxiliary stations and the frequencies generated by these oscillators are fed continuously through a keyer unit 204, shown as relay contacts, into combining pads 205 from which all frequencies are connected to the outgoing channel 206. If auxiliary stations were connected to separate east and west channels the same oscillators may serve the auxiliary stations on the two channels by means of separate keyer units and combining pads.

Under normal conditions, all transmitted frequencies are returned continuously over channel 207 and are separated by the band-pass filters 211, 212, 213, etc. The separate signals are amplified, rectified and converted to direct-current signals by individual amplifier-rectifier units 221, 222, 223, etc. An interruption of any frequency initiates the operation of the individual one of the alarm receiving and timing circuits 231, 232, 233, etc. and, if it is of sufficiently long duration to exceed the time provided by circuits 231, 232, 233, etc., causes an alarm to sound and lights the individual lamp 241, 242, 243, etc. to identify the auxiliary station to which the interrupted frequency is assigned.

When it is desired to transmit an order to an auxiliary station, the station select key individual to that auxiliary station in the station select key unit 208 is operated to select the proper keyer of the keyer unit 204 and place the keyer under the control of the dial 209. The ten-position dial 209 is then operated to cause the transmission of a digit corresponding to the desired order. A single digit number will of course permit the sending of ten diffeernt orders. If more than ten orders are required, a two-digit number can be used permitting the sending of a maximum of one hundred different orders. Proper interdigital transfer equipment would be required at the auxiliary station but no additional equipment would be necessary at the main station.

When it is desired to determine the cause of an alarm signal from one of the auxiliary stations, the station select key is operated followed by the operation of the scan start key in unit 208. The operation of the scan start key initiates the operation of the five-pulse per second generator which controls the selected keyer to interrupt the particular station frequency at this rate, meanwhile controlling the scanning circuit 250 to step a counting and steering circuit in synchronism with the interrupted frequency. A similar counting and steering circuit at the auxiliary station is operated under the control of the receiving circuit which receives the interrupted frequency at the auxiliary station to scan each alarm point successively. During the operation of the scanning equipment at the auxiliary station the steady frequency is removed from channel 207. When the scanning circuit encounters a marked alarm point a pulse of the station frequency is connected to channel 207 during the time that the frequency is connected to channel 206. This pulse of tone is recognized at the main station as identifying the alarm point and a relay and associated lamp in the indicator bank 251 is operated and locked under the control of the release key 252 to register the identity of the particular alarm point. Scanning continues until a required number of steps have been taken, after which the scanning circuit releases itself, both at the main station and at the auxiliary station. The bank of indicating lamps remaining lighted is a record of the alarms existing at the auxiliary station scanned. The alarm receiving circuit 231, 232 or 233 associated with the station being scanned will be disabled during scanning to prevent the absence of the returned frequency from falsely bringing in an alarm.

Figure 3:
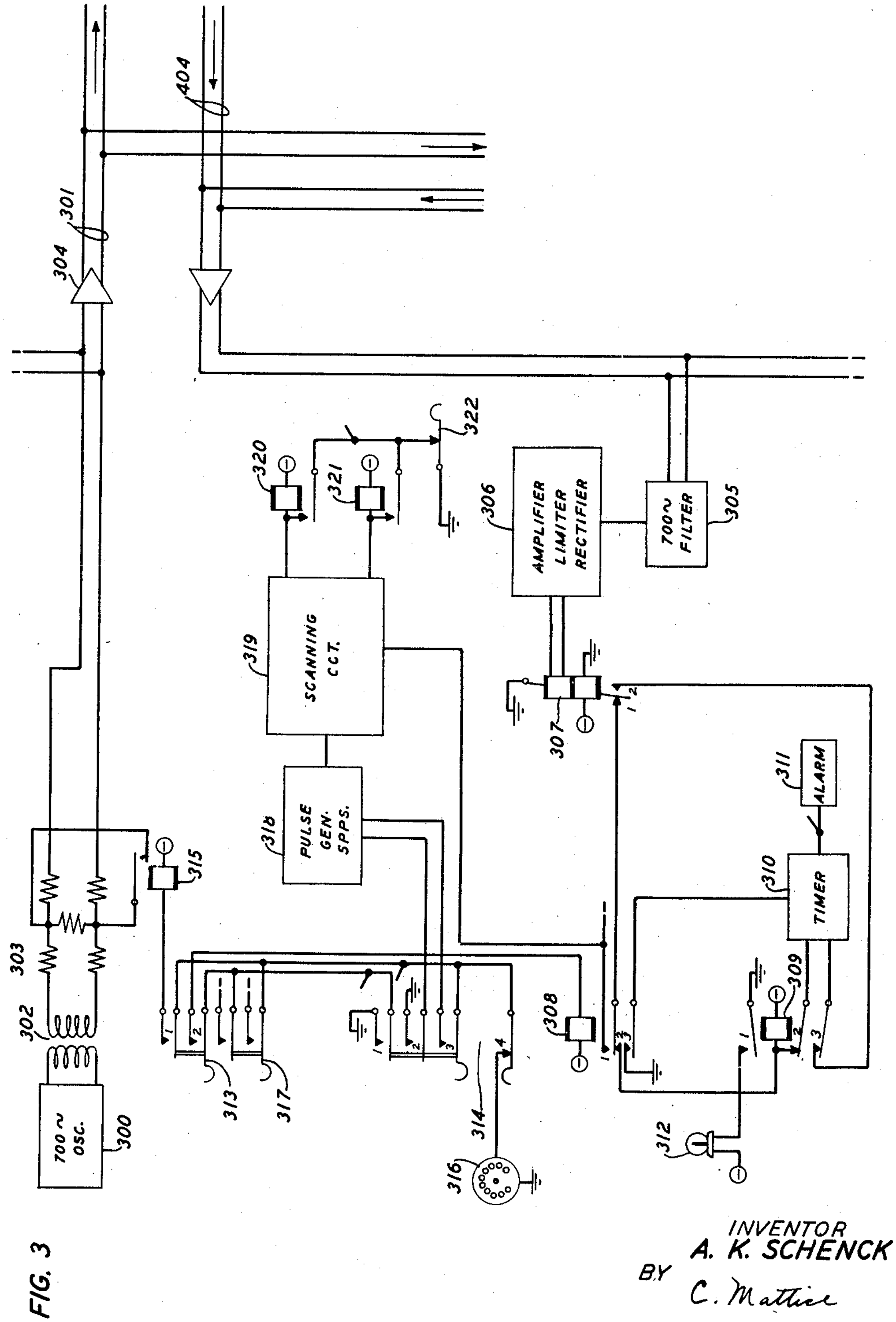
Fig. 3 is a somewhat detailed showing of the equipment at the main station individual to a particular auxiliary station.
Figure 4:
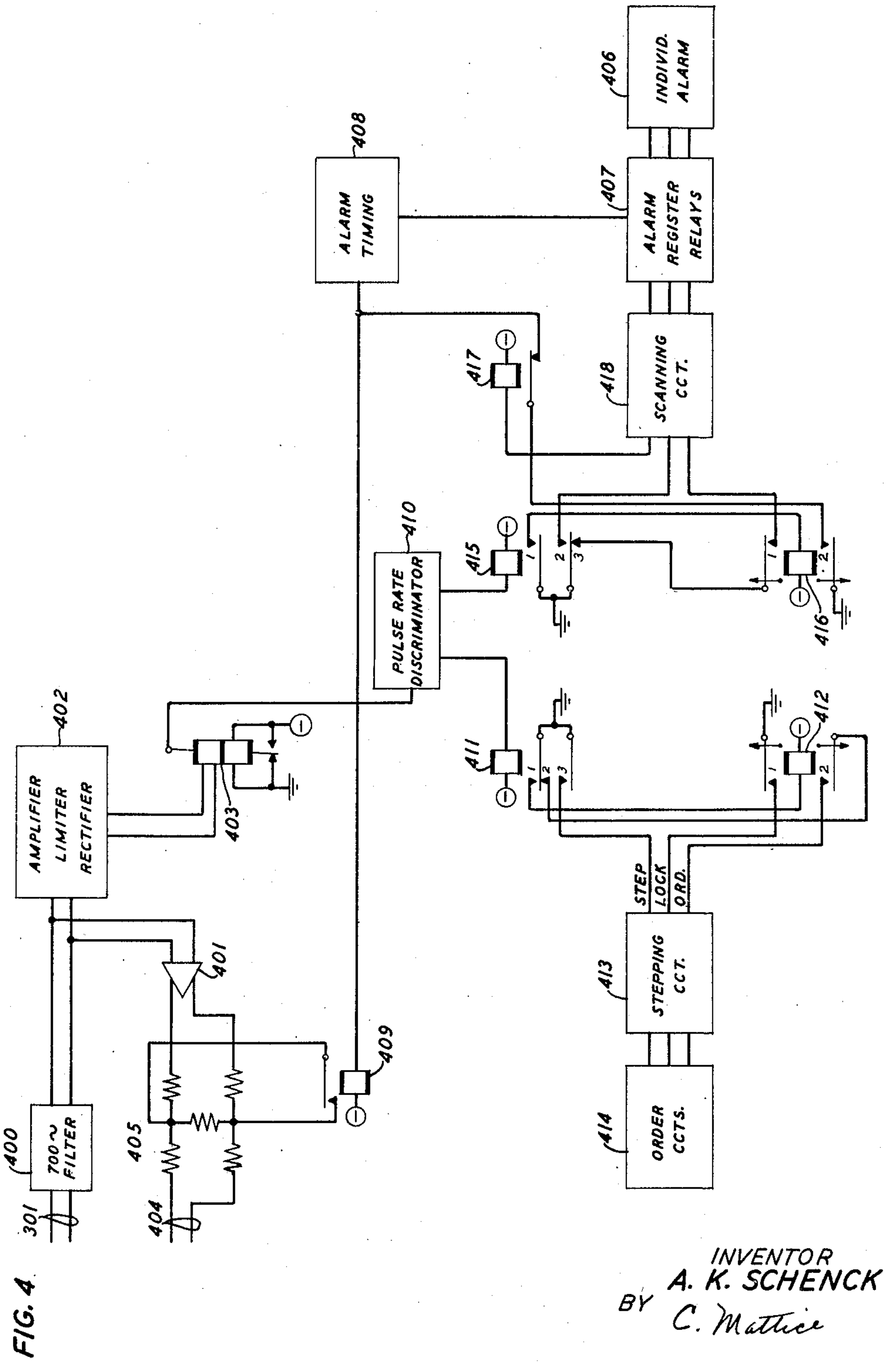
Fig. 4, which should be placed at the right of Fig. 3, is a somewhat detailed showing of the equipment at one auxiliary station.

The equipment at one auxiliary station which has been assumed to be the station responsive to the 700-cycle frequency is shown in Fig. 4. For convenience in describing the operations at the auxiliary station, Fig. 3 shows the 700-cycle equipment at the main office. The 700-cycle frequency generated by oscillator 300 is fed to channel 301 through repeating coil 302, keyer circuit 303 and amplifier 304 (combining pad omitted for simplification). At the auxiliary station the 700-cycle frequency is separated from the other frequencies by the band-pass filter 400 which terminates in a variable gain amplifier 401 and a detecting circuit 402 consisting of an amplifier, a voltage limiter, a rectifier and pulsing relay 403. The variable gain amplifier 401 is adjusted to return the necessary level of station frequency to the return channel 404 through the keyer circuit 405.

At the main station a 700-cycle band-pass filter 305 separates this frequency, feeding it to the detecting circuit 306 which functions to normally hold relay 307 operated under control of the continuously received 700-cycle frequency. With relay 307 operated, a circuit is closed over contact 1 of relay 307, contact 2 of disabling relay 308 to the winding of the alarm control relay 309. Relay 309 is operated and locked under the control of the timer 310.

In the auxiliary station whenever one of the individual alarms 406 operates, it in turn operates its associated alarm register relay 407 which causes the alarm timing circuit 408 to operate relay 409 connecting a short circuit across the keyer circuit 405 to prevent the incoming frequency from passing to channel 404. The alarm timing circuit 408 maintains the circuit of relay 409 for a fixed time and then releases relay 409 to permit the 700-cycle frequency to again pass to channel 404.

At the main station the removal of the 700-cycle frequency from channel 404 causes relay 307 to release. Since relay 309 is locked under the control of the timing circuit 310, the latter relay does not release but permits the closing of a circuit from contact 2 of relay 307 over contact 3 of relay 309 to the timer 310 to initiate the timing operation. If the released time of relay 307 exceeds a predetermined interval, the timer 310 operates alarm 311 and releases relay 309 to light lamp 312 to identify the source of alarm. This alarm sending and receiving equipment may be the same as that disclosed in the above-identified Clutts et al. patent.

When it is desired to transmit an order to the auxiliary station, key 313 individual to the auxiliary station is operated, scan start key 314 remaining unoperated. With key 313 operated, relay 315, which is individual to the 700-cycle keyer, is connected over contact 1 of key 313 and contact 4 of key 314 to the dial 316, which generates a train of pulses at a rate of twenty pulses per second. The circuit as shown assumes that the dial 316 is of special design so that it operates relay 315 for each pulse, but a conventional dial and suitable intermediate equipment may be used for that purpose. Each operation of relay 315 connects a short circuit across the keyer circuit 303 to interrupt the transmission of 700-cycle current to the auxiliary station. At the auxiliary station relay 403 is normally held operated in the output of the detector circuit 402 connecting ground to the pulse rate discriminator 410 and releases for each removal of 700-cycle current from channel 301 to connect negative battery to the pulse rate discriminator 410. The pulse rate discriminator circuit 410 recognizes the rate of these battery pulses and operates relay 411 in synchronism therewith (twenty pulses per second in this case). A suitable pulse rate discriminator circuit is disclosed and claimed in applicant's copending application Serial No. 398,738, filed December 17, 1953. Relay 411 at its contact 3 closes a circuit for operating stepping circuit 413 which advances to a position corresponding to the digit dialed. At its first operation relay 411 closes an obvious circuit for operating the slow releasing relay 412 which connects ground over its contact 1 to the stepping circuit 413 to hold that circuit in its advanced position. When relay 411 releases at the end of the digit, a circuit is closed over contact 2 of relay 411 and contact 2 of relay 412 to the stepping circuit to complete a circuit for one of the order circuits 414 in accordance with the position assumed by the stepping circuit 413. Although this circuit is closed momentarily between pulses the order circuits are arranged to be unresponsive to such momentary closures. When relay 412 releases after an interval, determined by its slow-to-release adjustment, stepping circuit 413 and order circuit 414 restore to normal.

When an alarm signal has been received, indicating that a trouble exists at the auxiilary station of Fig. 4, the attendant at the main station will operate the station select key 313 followed by the scan start key 314. At contact 1 of key 314 ground is connected over contact 2 of the station select key 313 to battery through the winding of relay 308. At contact 2 of key 314 a start circuit is closed for the pulse generator 318. At contact 3 of key 314 the output of the pulse generator 318 is connected over contact 1 of the station select key 313 to the winding of relay 315. The pulse generator 318 generates pulses at the rate of five pulses per second, causing relay 315 to operate at the same rate and connect a short circuit across keyer 303. At the same time the pulse generator 318 transmits pulses to the scanning circuit 319. This scanning circuit may be of the general type disclosed in the above-identified Clutts et al. patent which operates to prepare circuits for the trouble indicating relays, such as relays 320 and 321. Relay 308, in operating, connects contact 1 of relay 307 to the scanning circuit 319 to prepare for registering a trouble. At its contact 3, relay 308 connects ground to the timer circuit 310 to disable that circuit and to prevent the registration of an alarm during scanning.

At the auxiliary station, relay 403 follows the pulses caused by the repeated removal of the 700-cycle frequency, transmitting negative battery pulses at the same rate to the pulse rate discriminator 410. The pulse rate discriminator 410 recognizes the five pulses per second pulse rate as a scanning signal and operates relay 415 at the same rate. At its first operation, relay 415 operates slow-to-release relay 416 and connects ground over its contact 2 to the scanning circuit 418. This scanning circuit is also preferably of the general type disclosed in the above-identified Clutts et al. patent and successively scans the alarm points which may be grounded by the alarm register relays 407. Relay 416 also closes a circuit from ground over its contact 2, normally closed contact of relay 417 to battery through the winding of relay 409 so that, during the scanning operation, the short circuit is normally applied to the keyer 405 under the control of relay 417. Relay 416 also closes a circuit from ground over contact 3 of relay 415, contact 1 of relay 416 to the scanning circuit 418 to prepare a circuit for operating relay 417 under the control of the grounded alarm points so that the alarm signal may be transmitted only during the time that the 700-cycle frequency is connected to channel 301, at which time the scanning circuit 319 is conditioned to operate the corresponding alarm indicating relay. When the scanning circuit 418 connects with a grounded alarm point and relay 415 is released, relay 417 operates, opening the circuit of relay 409 which in turn opens the short circuit in the keyer 405 to cause the 700-cycle frequency to pass to channel 404 as a trouble signal. Relay 307 operates in response to this signal completing a circuit over its contact 1, contact 1 of relay 308 and through the scanning circuit 319 to one of the trouble indicating relays 320, 321, etc. operating that relay, which locks under the control of the release key 322. Each operated relay lights a corresponding lamp (not shown).

Just before the end of the scanning operation a number of synchronizing points are scanned, causing the lighting of lamps at the main station to indicate to the attendant that the scanning operation has been completed. The attendant may then restore keys 313 and 314 to stop pulse generator 318 and to restore the continuous application of the 700-cycle frequency. The restoration of key 313 releases relay 308 of make the timer 310 again effective. Both scanning circuits restore to normal at the completion of the scanning operation.

It will be apparent that the pulse generator 318 and scanning circuit 319, as well as dial 316, are common equipment and may be used to scan for troubles at and to transmit orders to other auxiliary stations by operating the proper station select key, such as key 317.

What is claimed is:

1. In a remote control system, a main station, an auxiliary station, a channel connecting said main station and said auxiliary station, means at said main station for transmitting a frequency individual to said auxiliary station over said channel, means at said main station for interrupting said individual frequency at a plurality of different rates, trouble registering means, order receiving means and means for scanning said trouble registering means at said auxiliary station, and means for selectively operating said order receiving means or said scanning means in accordance with the rate at which said frequency is interrupted by said main station.

2. In a remote control system, a main station, an auxiliary station, a channel connecting said main station and said auxiliary station, means at said main station for continuously transmitting a frequency individual to said auxiliary station over said channel, means at said main station for interrupting said individual frequency at one rate to transmit orders, means for interrupting said individual frequency at a different rate to control a trouble scanning operation, order receiving means at said auxiliary station, trouble registering means at said auxiliary station, scanning means at said auxiliary station for scanning said trouble registering means, pulse rate discriminating means at said auxiliary station, and means selectively operated under the control of said pulse rate discriminating means for operating said order receiving means or said scanning means in accordance with the rate at which said frequency is interrupted by said main station.

3. In a remote control system, a main station, an auxiliary station, two channels connecting said main station and said auxiliary station, means at said main station for continuously transmitting a frequency individual to said auxiliary station over one of said channels, means at said auxiliary station for retransmitting said individual frequency to said main station over the other of said channels, means at said main station for interrupting said individual frequency at one rate to transmit orders, means for interrupting said individual frequency at a different rate to control a trouble scanning operation, order receiving means at said auxiliary station, trouble registering means at said auxiliary station, scanning means at said auxiliary station for scanning said trouble registering means, pulse rate discriminating means at said auxiliary station, means selectively operated under the control of said pulse rate discriminating means for operating said order receiving means or said scanning means in accordance with the rate at which said frequency is interrupted by said main station, means under the control of said pulse rate discriminating means responsive to interruptions of said individual frequency at said different rate to prevent the retransmission of said individual frequency to said main station, and means under the control of said scanning means to permit the momentary retransmission of said individual frequency.

4. In a remote control system, a main station, an auxiliary station, two channels connecting said main station and said auxiliary station, means at said main station for continuously transmitting a frequency individual to said auxiliary station over one of said channels, means at said auxiliary station for retransmitting said individual frequency to said main station over the other of said channels, means at said main station for interrupting said individual frequency at one rate to transmit orders, means for interrupting said individual frequency at a different rate to control a trouble scanning operation, scanning means at said main station operated by said last-mentioned means, order receiving means at said auxiliary station, trouble registering means at said auxiliary station, scanning means at said auxiliary station for scanning said trouble registering means, pulse rate discriminating means at said auxiliary station, means selectively operated under the control of said pulse rate discriminating means for operating said order receiving means or said scanning means in accordance with the rate at which said frequency is interrupted by said main station, means under the control of said pulse rate discriminating means responsive to interruptions of said individual frequency at said different rate to prevent the retransmission of said individual frequency to said main station, means under the control of said scanning means to permit the momentary retransmission of said individual frequency, means at said auxiliary station for interrupting the retransmission of said individual frequency for a predetermined time interval to transmit an alarm indication, means at said main station for receiving said individual frequency over said second channel, timing means and alarm means at said main station, means responsive to the release of said frequency receiving means to initiate the operation of said timing means, means under the control of said timing means if said frequency receiving means remains released for said predetermined interval to operate said alarm means, and means under the control of the scanning means at said main station to disable said timing means.

5. In a remote control system, a main station, an auxiliary station, two channels connecting said main station and said auxiliary station, means at said main station for transmitting a frequency individual to said auxiliary station over one of said channels, means at said auxiliary station for normally transmitting said individual frequency to said main station over the other of said channels, means at said main station for interrupting said individual frequency at a plurality of different rates, trouble registering means, order receiving means and means for scanning said trouble registering means at said auxiliary station, means for selectively operating said order receiving means or said scanning means in accordance with the rate at which said frequency is interrupted by said main station, and means under the control of said trouble registering means and said scanning means to disable the transmitting means at said auxiliary station to transmit trouble indications to said main station.

6. In a remote control system, a main station, an auxiliary station, two channels connecting said main station and said auxiliary station, means at said main station for continuously transmitting a frequency individual to said auxiliary station over one of said channels, means at said auxiliary station for normally retransmitting said individual frequency to said main station over the other of said channels, means at said main station for interrupting said individual frequency at one rate to transmit orders, means for interrupting said individual frequency at a different rate to control a trouble scanning operation, order receiving means at said auxiliary station, trouble registering means at said auxiliary station, scanning means at said auxiliary station for scanning said trouble registering means, pulse rate discriminating means at said auxiliary station, means selectively operated under the control of said pulse rate discriminating means for operating said order receiving means or said scanning means in accordance with the rate at which said frequency is interrupted by said main station, and means under the control of said trouble registering means and said scanning means to disable the transmitting means at said auxiliary station to transmit trouble indications to said main station.

References Cited in the file of this patent

UNITED STATES PATENTS

| | | |
|---|---|---|
| 2,558,888 | Trimble | July 3, 1951 |
| 2,574,458 | Atkinson | Nov. 13, 1951 |
| 2,581,056 | Walmsley | Jan. 1, 1952 |